(12) United States Patent
Könning et al.

(10) Patent No.: US 12,460,159 B2
(45) Date of Patent: Nov. 4, 2025

(54) AQUEOUS POLYESTER COMPOSITIONS, DETERGENTS, AND CLEANING AGENTS CONTAINING THEM AND THEIR USE

(71) Applicant: Catexel GmbH, Wiesbaden (DE)

(72) Inventors: Daniel Könning, Frankfurt am Main (DE); Roman Morschhäuser, Mainz (DE); Judith Preuschen, Sörgenloch (DE); Paul Kaufmann, Hoccheim am Main (DE); Niklas Diekhans, Bischhofsheim (DE); Said Kchirid, Heidenbrücken (DE); Stefan Riegelbeck, Frankfut am Main (DE); Bastian Viel, Büttelborn (DE)

(73) Assignee: Catexel GmbH (DE)

( * ) Notice: Subject to any disclaimer, the term of this patent is extended or adjusted under 35 U.S.C. 154(b) by 331 days.

(21) Appl. No.: 18/036,501

(22) PCT Filed: Sep. 30, 2021

(86) PCT No.: PCT/EP2021/000114
§ 371 (c)(1),
(2) Date: May 11, 2023

(87) PCT Pub. No.: WO2022/100876
PCT Pub. Date: May 19, 2022

(65) Prior Publication Data
US 2024/0010953 A1    Jan. 11, 2024

(30) Foreign Application Priority Data

Nov. 13, 2020 (DE) .................. 102020 006 977.0

(51) Int. Cl.
| | | |
|---|---|---|
| C11D 3/00 | (2006.01) | |
| C08G 63/183 | (2006.01) | |
| C08G 63/672 | (2006.01) | |
| C08G 63/688 | (2006.01) | |
| C08L 67/02 | (2006.01) | |
| C11D 3/37 | (2006.01) | |

(52) U.S. Cl.
CPC .......... *C11D 3/3715* (2013.01); *C08G 63/183* (2013.01); *C08G 63/672* (2013.01); *C08G 63/6886* (2013.01); *C08L 67/02* (2013.01); *C11D 3/0036* (2013.01); *C08L 2205/02* (2013.01); *C11D 2111/12* (2024.01)

(58) Field of Classification Search
CPC . C11D 3/3715; C11D 3/0036; C11D 2111/12; C11D 3/201; C11D 3/2041; C11D 3/2065; C08G 63/183; C08G 63/672; C08G 63/6886; C08L 67/02; C08L 2205/02
USPC ........................................................ 510/299
See application file for complete search history.

(56) References Cited

U.S. PATENT DOCUMENTS

| | | |
|---|---|---|
| 4,427,557 A | 1/1984 | Stockburger |
| 4,702,857 A | 10/1987 | Gosselink |
| 4,721,580 A | 1/1988 | Gosselink |
| 4,968,451 A | 11/1990 | Scheibel |
| 5,415,807 A | 5/1995 | Gosselink et al. |
| 5,599,782 A | 2/1997 | Pan et al. |
| 5,691,298 A | 11/1997 | Gosselink et al. |
| 2014/0274860 A1 * | 9/2014 | Bankers .......... C11D 3/10 510/299 |

FOREIGN PATENT DOCUMENTS

| | | | |
|---|---|---|---|
| DE | 19906367 | 8/2000 | |
| DE | 102014218952 | 9/2014 | |
| EP | 1966273 | 9/2008 | |
| EP | 2504380 | 10/2012 | |
| EP | 3222647 A1 * | 9/2017 | ........... C11D 3/0036 |
| WO | 199422937 | 10/1994 | |
| WO | 1996018715 | 6/1996 | |
| WO | 199805747 | 2/1998 | |
| WO | 2011063945 | 6/2011 | |

* cited by examiner

*Primary Examiner* — Eisa B Elhilo
(74) *Attorney, Agent, or Firm* — M. Susan Spiering; Dehoa & Associates P.C.

(57) ABSTRACT

Aqueous polyester compositions, detergents and cleaning agents containing them and their use Disclosed are aqueous compositions of selected anionic polyesters and of selected nonionic polyesters.

These compositions are characterized by good storage stability and low viscosity and can be used in detergents and cleaning agents to improve soil release.

18 Claims, No Drawings

AQUEOUS POLYESTER COMPOSITIONS, DETERGENTS, AND CLEANING AGENTS CONTAINING THEM AND THEIR USE

CLAIM FOR PRIORITY

This application is a national phase application of PCT/EP 2021/000114 filed 30 Sep. 2021, which was based on application DE 10 2020 006 977.0 filed 13 Nov. 2020. The priorities of PCT/EP 2021/000114 and DE 10 2020 006 977.0 are hereby claimed and their disclosures incorporated herein by reference.

TECHNICAL FIELD

The invention concerns aqueous compositions of selected polyesters which are suitable as additives to detergents and cleaning agents and which are characterized by very good soil release properties.

BACKGROUND

The use of polyesters in detergents to improve soil release from textiles, to reduce resoiling, to protect fibers under mechanical stress and to equip fabrics with an anti-creasing effect is well known. A variety of polyester types and their use in detergents and cleaning agents are described in the patent literature. These polyesters are commonly known under the term SRP or "soil-release polyester".

Examples of such polyesters can be found in U.S. Pat. Nos. 4,702,857 A, 4,427,557 A, 4,721,580 A, 4,968,451 A, WO 96/18715 A2, U.S. Pat. No. 5,415,807 A, U.S. Pat. No. 5,691,298, DE199 06 367 A1, WO 98/05747 A1, U.S. Pat. No. 5,599,782 A, WO 94/22937 A1, EP 1 966 273 B1 and EP 2 504 380 A1.

Polyesters with improved soil release properties may contain anionic groups and/or nonionic groups. These may occur as end groups in the polyester molecule or they may be residues that occur in the groups that build up the polymer backbone. An example of anionic radicals are sulfonic acid groups; these can occur, for example, in 5-sulfoisophthalic acid residues or as end groups derived from isethionic acid. An example of nonionic radicals are polyethylene glycol radicals; these can occur, for example, in the polymer backbone of the polyester or as end groups.

Anionic polyesters dissolved in water cannot usually be stored. These polyesters are structured in such a way that they can be attached onto a polymer fiber from an aqueous medium, for example a wash liquor. For this purpose, the structure of these polyesters must be hydrophilic enough to become transported in water; on the other hand, however, this polyester must also be hydrophobic enough to be able to become attached onto the fiber.

Because of these properties, the polyester molecule in water is likely to be in aggregate form even when it appears dissolved. One consequence of this "semi-solubility" is crystallization of the polymer chains "in solution." Larger aggregates form, which scatter light, making the dispersion opaque and appearing white. Unfortunately, as crystallization progresses, viscosity also increases as larger and larger aggregates form. This can lead to a stab-resistant consistency.

For the processing and application of polyesters with soil release properties, it is important that they can be stored as aqueous compositions and that the increase in viscosity is kept within limits.

That concentrates of SRP with selected structure can be prepared in organic/aqueous media is described, for example, in WO 2011/063945 A1. In this document aqueous concentrates of special anionic polyesters are described, which can be stored for a certain time. The objective of the invention described in this document was the development of polyester structures based on monomers containing sulfo groups which, on the one hand, exhibit very good graying-inhibiting performance when used in liquid detergents and, on the other hand, show only a minimal tendency to crystallize in aqueous solution and are stable for storage as a solution. These polymer solutions, referred to as concentrates, should be suitable for use in liquid detergent formulations while being as clear and showing low viscosity as possible. The solution described in WO 2011/063945 A1 consists of using selected sulfo group containing polyesters with a specific ratio of propylene glycol to ethylene glycol units.

A possible further measure for stabilizing SRP compositions is the addition of small amounts of organic solvents. Such compositions are described, for example, in EP 3 517 597 A1. In the case of anionic SRPs, however, it has been shown that this measure is not always successful. For example, an aqueous composition of a polyester was investigated which had ethylene glycol terepthalate and propylene glycol terephthalate units, as well as end groups derived from isethionic acid and from polyethylene glycol monomethyl ether. Organic alcohols, such as 1,2-propylene glycol or glycerol, were added to this aqueous composition. It was found that after a few hours the viscosity at 25° C. increased from an initial 400 mPas to over 45,000 mPas. Thus, this product cannot be reasonably handled or processed in this form.

Compositions of selected SRPs in organic/aqueous media are known, for example, from WO 2011/063945 A1. There, concentrates of anionic polyesters in water and/or in water-miscible organic solvents are described. However, there is no indication that other polymers besides anionic polyesters can be used to stabilize the compositions.

Combinations of anionic and nonionic SRPs have already been used in detergents. DE 10 2014 218 952 A1 describes surfactant-containing agents for textile treatment that contain at least one anionic aromatic polyester and at least one nonionic aromatic polyester. It was found that by combining two specific SRPs, the primary washing power of the agent can be increased. However, it was found that providing the combination of the SRPs in a surfactant-containing medium is difficult to achieve. Combining the SRP with surfactants in a clear liquid detergent leads to turbidity or formation of deposits when the SRP is added or when the agent is stored. Therefore, it is proposed in this document to provide the polyester combinations as storage-stable portions. In the examples, packaging is used for this purpose in which the SRPs are stored in different chambers and are combined only during the washing process.

Anionic SRPs are often solid or waxy at room temperature, while non-ionic SRPs are often liquid. If anionic and nonionic SRPs are combined with or without surfactants, solid or initially liquid compositions are formed depending on the mixing ratio, the latter also solidifying after some time.

From US 2014/0274860 A1 granulated detergents are known which, in addition to builders, fillers, alkali carriers, surfactants, also contain synergistically acting combinations of anionic and nonionic SRPs. These detergents are in solid form so that no cloudiness or deposits can form during storage.

A need continues to exist for SRP's whose viscosities and compositions remain stable over prolonged periods of time.

SUMMARY OF THE INVENTION

The present invention is directed to aqueous compositions of selected anionic polyesters and of selected nonionic polyesters. These compositions are characterized by good storage stability and low viscosity and can be used in detergents and cleaning agents to improve soil release.

The inventive compositions of matter comprise:

A) at least one anionic polyester obtainable by polymerization of the components
   a) one or more aromatic dicarboxylic acids which are free from sulfo groups and/or salts thereof and/or anhydrides thereof and/or esters thereof,
   b) optionally one or more dicarboxylic acids containing sulfo groups, their salts and/or their anhydrides and/or their esters,
   c) one or more aliphatic diols of the formula (1)

   $$H-(OC_mH_{2m})_s-OH \quad (1),$$

wherein
   m is a number from 2 to 10 and m can assume different meanings within a molecule within the scope of the given definition,
   s is a number from 1 to 200, where s is at least 1 and can additionally assume a value between 2 and 200,
   d) optionally one or more compounds of the formula (2)

   $$R^1O(C_oH_{2o}O)_pH \quad (2)$$

wherein
   $R^1$ is a linear or branched alkyl group containing 1 to 22 carbon atoms,
   is a number from 2 to 10 and o can assume different meanings within a molecule within the scope of the given definition,
   p is a number from 1 to 200,
   e) optionally one or more compounds of the formula (3) and/or of the formula (4)

   $$R^2(C_qH_{2q}O)_rH \quad (3),$$

   $$(Me^{a+})_b{}^-O_3S-C_6H_4-COOR^{10} \quad (4),$$

wherein
   q is a number from 2 to 10,
   r is a number from 1 to 10, and
   $R^2$ is a radical $(Me^{a+})_b{}^-OOC-$ or $(Me^{a+})_b{}^-O_3S-$,
   $R^{10}$ is hydrogen or $C_1$-$C_6$-alkyl,
   Me is hydrogen or an a-valent cation,
   a is a number from 1 to 3,
   b is a number having the value 1/a, and
   f) optionally one or more crosslinking polyfunctional compounds, with the proviso that at least one of components b) or e) is present, B) at least one nonionic polyester obtainable by polymerization of components a), c), d) and optionally f) defined above, C) one or more aliphatic or cycloaliphatic alcohols containing 1-20 carbon atoms, and D) water.

The inventive compositions of matter may be used in the following:
a) detergents and cleaning agents;
b) for washing textiles or for drying and cleaning hard surfaces;
c) to improve soil release from textiles, to reduce resoiling, to protect fibers under mechanical stress and to provide fabrics with an anti-creasing effect.

DETAILED DESCRIPTION OF THE INVENTION

Based on the noted prior art, the present invention was based on the objective of providing compositions of SRP that are stable over time, whose viscosity does not increase or does not increase appreciably even during prolonged storage, and which do not become cloudy or form deposits during storage.

Another objective of the present invention was to provide stable low viscosity SRP compositions.

Surprisingly, it was found that the viscosity of alcoholic-aqueous compositions of anionic SRP can be lowered by the addition of nonionic SRP and that the compositions thus stabilized can be stored for months without their viscosity increasing excessively. Compositions according to the invention do not thicken and remain stable for several months even during warm storage, i.e. they neither cloud up nor form deposits.

The present invention relates to compositions comprising

A) at least one anionic polyester obtainable by polymerization of the components
   a) one or more aromatic dicarboxylic acids which are free from sulfo groups and/or salts thereof and/or anhydrides and/or esters thereof,
   b) optionally one or more dicarboxylic acids containing sulfo groups, their salts and/or their anhydrides and/or their esters,
   c) one or more aliphatic diols of the formula (1)

   $$H-(OC_mH_{2m})_sOH \quad (1),$$

wherein
   m is a number from 2 to 10 and m can assume different meanings within a molecule within the scope of the given definition,
   s is a number from 1 to 200, where s is at least 1 and can additionally assume a value between 2 and 200,
   d) optionally one or more compounds of the formula (2)

   $$R^1O(C_oH_{2o}O)_pH \quad (2)$$

wherein
   $R^1$ is a linear or branched alkyl group containing 1 to 22 carbon atoms,
   is a number from 2 to 10 and o can assume different meanings within a molecule within the scope of the given definition,
   p is a number from 1 to 200,
   e) optionally one or more compounds of the formula (3) and/or of the formula (4)

   $$R^2(C_qH_{2q}O)_rH \quad (3),$$

   $$(Me^{a+})_b{}^-O_3S-C_6H_4-COOR^{10} \quad (4),$$

wherein
   q is a number from 2 to 10,
   r is a number from 1 to 10, and
   $R^2$ is a radical $(Me^{a+})_b{}^-OOC-$ or $(Me^{a+})_b{}^-O_3S-$,
   $R^{10}$ is hydrogen or $C_1$-$C_6$-alkyl,
   Me is hydrogen or an a-valent cation,
   a is a number from 1 to 3,
   b is a number having the value 1/a, and f) optionally one or more crosslinking polyfunctional compounds, with the proviso that at least one of components b) or e) is present, B) at least one nonionic polyester obtainable by polymerization of components a), c), d) and optionally f) defined above, C) one or more aliphatic or cycloaliphatic alcohols containing 1-20 carbon atoms, and D) water.

The proportion by weight of the total amount of polyesters A and B in the compositions according to the invention is usually from 1 to 50%, preferably from 5 to 40%, in particular from 10 to 30% and very preferred from 15 to 25%, based on the total amount of the composition.

The proportion by weight of the total amount of (cyclo) aliphatic alcohols having 1-10 carbon atoms in the composition according to the invention is usually 20 to 95%, preferably 40 to 80%, in particular 60 to 70% and very preferred 50 to 75%, based on the total amount of the composition.

The proportion by weight of water in the composition according to the invention is usually 1 to 50%, preferably 2 to 30%, in particular 5 to 20% and very preferred 7 to 15%, based on the total amount of the composition.

In addition to the polyesters A and B, the composition according to the invention contains water-soluble or water-miscible (cyclo)aliphatic alcohols, water and optionally further additives, such as water-miscible non-alcoholic organic solvents, e.g. acetone, surfactants, dyes, fragrances or buffer substances.

The proportion by weight of the total amount of optional further additives in the composition according to the invention is usually 0 to 20%, preferably 0 to 10%, and very preferred 0 to 5%, based on the total amount of the composition.

The proportion by weight of polyester A to the total mass of polyesters A and B in the compositions according to the invention is usually from 1 to 99%, preferably from 20 to 80%, more preferred from 30 to 70%, and most preferred from 40 to 60%.

The proportion by weight of polyester B in the total mass of polyesters A and B in the compositions according to the invention is usually 99 to 1%, preferably 80 to 20%, particularly preferred 70 to 30% and most preferred 60 to 40%.

Monomer component a) is a sulfogroup-free aromatic dicarboxylic acid and/or its salts and/or its anhydrides and/or its esters.

Preferred compounds of monomer component a) are terephthalic acid, in particular the $C_1$-$C_4$ dialkyl esters of terephthalic acid, for example dimethyl terephthalate, and isophthalic acid and $C_1$-$C_4$ dialkyl esters of isophthalic acid or naphthalenedicarboxylic acid and $C_1$-$C_4$ dialkyl esters of naphthalenedicarboxylic acid. Monomer component a) forms the backbone of the polyester used according to the invention.

Monomer component b) is a dicarboxylic acid containing sulfo groups, its salts and/or its anhydrides and/or its esters. Preferred compounds of monomer component b) are 5-sulfoisophthalic acid, in particular 5-sulfoisophthalic acid di($C_1$-$C_4$)alkyl esters and their alkali metal salts, for example alkali metal salts of 5-sulfoisophthalic acid and 5-sulfoisophthalic acid dimethyl ester sodium salt or lithium salt. Monomer component b) forms the backbone of the polyester used according to the invention.

Monomer component c) is an aliphatic diol of the formula (1) defined above. These may be straight-chain or branched aliphatic diols. Diols of monomer component c) are alkylene glycols which may be used together with polyoxyalkylene compounds. In the context of this description, polyoxyalkylene compounds are homopolymers or copolymers derived from alkylene oxides. In the case of different alkylene oxide units in the molecule, for example units derived from ethylene oxide and from propylene oxide, the different units may be present randomly distributed in the polymer or may be present in the form of blocks, or there may be a gradual change in the monomer composition from predominantly one type of monomer to predominantly another type of monomer (gradient copolymer). An example of a block copolymer is an ethylene oxide/propylene oxide block copolymer. If different alkylene oxide units are present in the molecule, these are cases in which m within a molecule can assume different meanings within the scope of the given definition, Preferably, only alkylene glycols (index s=1) are used, and very preferably only ethylene glycol.

Index s is preferably a number from 1 to 50, in particular from 1 to 20, very particularly from 1 to 10 and most preferred 1.

Preferred compounds of monomer component c) are ethylene glycol, propylene glycol, in particular 1,2-propylene glycol.

Preferred polyoxyalkylene compounds used are polyoxyethylene compounds with 2 to 20, in particular with 2 to 10 ethyleneoxy repeat units or polyoxypropylene compounds with 2 to 20, in particular with 2 to 10 propyleneoxy repeat units.

Further preferred monomer components c) are mixtures of ethylene glycol and ethylene oxide-propylene oxide block copolymers corresponding to the formula

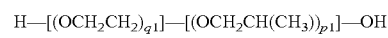

wherein q1 is a number from 12 to 120 and p1 is a number from 11 to 60, preferably from 15 to 50, and particularly preferred from 20 to 40. Polyesters derived from these monomer components are known, for example, from EP 2670786 B1.

If mixtures of alkylene glycols and polyoxyalkylene compounds are used, the molar mixing ratio of alkylene glycols to polyoxyalkylene compounds is usually from 20:1 to 1:1, preferably from 10:1 to 5:1. The monomer component c) forms the backbone of the polyester used according to the invention.

The monomer component d) is a compound of the formula (2) defined above. These may be straight-chain or branched aliphatic compounds. Preferred compounds of monomer component d) are unilaterally end-capped alkylene glycols or unilaterally end-capped polyoxyalkylene compounds. In the context of this description, polyoxyalkylene compounds are homopolymers or copolymers derived from alkylene oxides. In the case of different alkylene oxide units in the molecule, for example units derived from ethylene oxide and from propylene oxide, the different units may be randomly distributed in the polymer or may be present in the form of blocks, or there may be a gradual change in monomer composition from predominantly one type of monomer to predominantly another type of monomer (gradient copolymer). An example of a block copolymer is an ethylene oxide/propylene oxide block copolymer. If different alkylene oxide units are present in the molecule, these are cases where o can assume different meanings within a molecule within the given definition. Ethylene glycol monomethyl ethers, polyoxyethylene monomethyl ethers with average molecular weights of 200 to 2,000 g/mol or poly[ethylene oxide-copropylene oxide] monomethyl ethers with average molecular weights of 100 to 20,000 g/mol, preferably 500 to 10,000 g/mol, are preferred. The monomer component d) forms end groups of the polyester used according to the invention.

Index o is preferably a number from 2 to 4 and in particular from 2 to 3.

Index p is preferably a number from 1 to 50, in particular from 1 to 20, very particularly from 1 to 10 and most preferred from 2 to 3.

Other monomer components d) preferably used are mixtures of ethylene glycol end-capped on one side and ethylene oxide-propylene oxide block copolymers corresponding to the formula

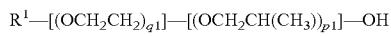

wherein

R$^1$ has the meaning defined above, preferably C$_{1-6}$-alkyl, in particular methyl, q1 is a number from 12 to 120, and p1 is a number from 11 to 60, preferably from 15 to 50, and particularly preferred from 20 to 40. Polyesters derived from these monomer components are known, for example, from EP 2670786 B1.

The monomer component e) is a compound of the formulae (3) and/or (4) defined above. The compounds of formula (3) may be straight-chain or branched aliphatic compounds. Preferred compounds of formula (3) are those of formula H—(OCH$_2$CH$_2$)$_{r1}$—SO$_3$X, where r1 is a number from 1 to 4, particularly preferred 1 and 2, and X is hydrogen, sodium or potassium. The compounds of formula (4) are derivatives of sulfobenzoic acid. They may be the free sulfobenzoic acid, its salts or esters, in particular the free acid, its alkali metal or alkaline earth metal salts or its alkyl esters. The sulfo group may be in 2-, 3- or 4-position of the phenyl ring, preferably in 3-position.

Preferred compounds of formula (4) are those of formula XO$_3$S—C$_6$H$_4$—COOY, where X and Y independently of one another represent hydrogen, sodium or potassium.

Index q is preferably a number from 2 to 4 and in particular from 2 to 3.

Index r is preferably a number from 1 to 5, in particular from 1 to 4 and most especially from 1 to 3.

The monomer component e) forms end groups of the polyester used according to the invention.

Me in the formulae (3) and (4) preferably stands for hydrogen or for a mono- to trivalent cation, preferably for hydrogen, an alkali metal cation, an alkaline earth metal cation or an ammonium cation.

The monomer component f) is a crosslinking polyfunctional compound. The monomer component f) forms the backbone of the polyester used according to the invention. Preferred compounds of monomer component f) are crosslinking polyfunctional compounds having at least 3, in particular 3 to 6, functional groups capable of esterification reaction, for example acid, alcohol, ester, anhydride or epoxy groups. Different functionalities in one molecule are also possible. Preferred examples are citric acid, malic acid, tartaric acid and gallic acid, particularly preferred 2,2-dihydroxymethylpropionic acid. Polymeric crosslinkers can also be used, for example polyacrylic acid, polymaleic acid or maleic acid-ethylene copolymers.

Furthermore, trivalent or higher alcohols, such as pentaerythritol, glycerol, sorbitol and trimethylolpropane, can be used as monomer component f).

Further preferred monomer components f) are trivalent or higher aliphatic and aromatic carboxylic acids, such as benzene-1,2,3-tricarboxylic acid (hemimellitic acid), benzene-1,2,4-tricarboxylic acid (trimellitic acid), particularly preferred benzene-1,3,5-tricarboxylic acid (trimesitic acid).

In addition to the structural units derived from monomer components a) to f), polyesters A may contain further structural units g) derived from monomers copolymerizable with monomers a) to f), the monomers g) differing from monomers a) to f). The molar proportion of these further structural units g) in polyester A is usually 0 to 10%, in particular 0 to 5%. Particularly preferred, polyesters A do not contain any further structural units g). Examples of monomers g) are diamines, bisphenols, polyester-forming phosphorus compounds or polyester-forming sulfur compounds.

Individual monomer components or mixtures of various compounds corresponding to a monomer component can be used to prepare the polyesters A or B.

Polyester A contains at least one structural unit with an ionic group. These structural units are derived from monomer units b) or e). At least one of these monomer units, and optionally both of these monomer units, are used to prepare polyester A.

Polyester B does not contain a structural unit with an ionic group. Only monomer units a), c) and d) are used in the production of polyester B, as well as optionally crosslinker f) and optionally other monomers g').

In addition to the structural units derived from the monomer components a), c), d) and f), polyesters B may contain further nonionic structural units g') derived from monomers copolymerizable with the monomers a), c), d) and f), the monomers g') differing from the monomers a), c), d) and f). The molar proportion of these further structural units g') in polyester B is usually 0 to 10%, in particular 0 to 5%. Particularly preferred, polyesters B do not contain any further structural units g'). Examples of monomers g') are diamines, bisphenols, polyester-forming phosphorus compounds or polyester-forming sulfur compounds.

The molar fraction of component a), based on the total polyester A, is generally from 20 to 50%, particularly preferred from 25 to 45% and most preferred from 35 to 42%.

The molar fraction of component b), based on the total polyester A, is generally from 0 to 40%, particularly preferred from 5 to 25% and most preferred from 10 to 20%.

The molar fraction of component c), based on the total polyester A, is generally from 20 to 60%, particularly preferred from 25 to 55% and most preferred from 35 to 48%.

The molar fraction of component d), based on the total polyester A, is generally from 0.5 to 40%, particularly preferred from 1 to 20% and most preferred from 4 to 10%.

The molar fraction of component e), based on the total polyester A, is generally from 0 to 10%, particularly preferred from 1 to 8% and most preferred from 2 to 5%.

The molar fraction of component f), based on the total polyester A, is generally from 0 to 10%, particularly preferred from 0 to 5% and most preferred from 0 to 3%.

Particularly preferred polyesters A are non-crosslinked.

The molar fraction of component a), based on the total polyester B, is generally from 30 to 50%, particularly preferred from 45 to 55% and most preferred from 39 to 41%.

The molar fraction of component c), based on the total polyester B, is generally from 10 to 50%, particularly preferred from 15 to 40% and most preferred from 25 to 35%.

The molar fraction of component d), based on the total polyester B, is generally from 1 to 40%, particularly preferred from 10 to 35% and most preferred from 20 to 30%.

The molar fraction of component f), based on the total polyester B, is generally from 0 to 10%, particularly preferred from 0 to 5% and most preferred from 0 to 3%.

Particularly preferred polyesters B) are non-crosslinked.

Preferred compositions comprise polyesters A and/or B in which component a) is selected from the group consisting of terephthalic acid, isophthalic acid, naphthalenedicarboxylic acid, alkali metal salts or alkaline earth metal salts thereof or dialkyl esters thereof.

Further preferred compositions contain polyesters A in which component b) is selected from the group consisting of sulfoterephthalic acid, sulfoisophthalic acid, sulfonaphthalene dicarboxylic acid, their alkali metal salts or alkaline earth metal salts or their dialkyl esters.

Further preferred compositions contain polyester A and/or B in which component c) is selected from the group consisting of ethylene glycol, propylene glycol, butylene glycol or mixtures of two or more thereof, preferably ethylene glycol, 1,2-propylene glycol or mixtures thereof and particularly preferably ethylene glycol.

Further preferred compositions contain polyesters A and/or B, in which component d) is a compound of formula (2a)

$$R^3O(CHR^4CHR^5O)_tH \quad (2a)$$

wherein
$R^3$ represents a linear or branched alkyl group with 1 to 6 C atoms, in particular with 1 to 3 C atoms,
$R^4$ and $R^5$ independently of one another represent hydrogen or an alkyl group having 1 to 4 carbon atoms, and
t is a number from 1 to 50, preferably from 12 to 30.

Other preferred compositions contain polyesters A, in which component e) is a compound corresponding to formula (3a)

$$MeO_3S-(CHR^6CHR^7O)_uH \quad (3a)$$

wherein
Me is hydrogen, a monovalent metal cation or an ammonium cation,
$R^6$ and $R^7$ independently of one another represent hydrogen or an alkyl group having 1 to 4 carbon atoms, and
u is a number from 1 to 50, preferably from 1 to 5 and most preferred from 1 or 2.

Other preferred compositions contain polyesters A, in which component e) is a compound of the formula (3b)

$$MeO_3S-C_6H_4-COOR^{11} \quad (3b)$$

wherein
Me is hydrogen, a monovalent metal cation or an ammonium cation, preferably hydrogen or a sodium cation, and
$R^{11}$ is hydrogen, a monovalent metal cation or an ammonium cation, preferably hydrogen or a sodium cation, and wherein
the sulfonyl group is arranged in particular in the 3-position of the phenyl ring.

Further preferred compositions contain polyesters A in which component e) is a mixture of the compounds of the formulae (3a) and (3b) defined above.

Still further preferred compositions comprise polyesters A and/or B in which structural units derived from component f) have the formula (6) or are derived from polyacrylic acid, polymaleic acid or from maleic acid-ethylene copolymers

(6)

wherein
y is a number from 3 to 6
$R^8$ is a three- to six-valent organic radical, preferably a three- to six-valent alkyl or aryl radical, and
X is —O— and/or —COO— and in which
the molar proportion of structural units derived from component f) in the polyester, based on the total amount of structural units in the polyester, is from 0 to 5 mol %, preferably from 0 to 3 mol % and very preferred from 0 to 1 mol %.

Particularly preferred polyesters A are known from DE 10 2016 003 544 A1.

In a particularly preferred embodiment, the compositions according to the invention comprise polyesters A having recurring structural units of the formula Ia and having end groups of the formula II and of the formula III or having end groups of the formula II and of the formula IV or having end groups of the formula II, III and IV or the compositions comprise polyesters A having recurring structural units of the formula Ia and of the formula Ib and having end groups of the formula II and of the formula III or having end groups of the formula II and of the formula IV or having end groups of the formula II, III and IV

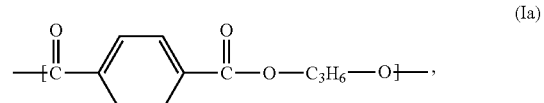

(Ia)

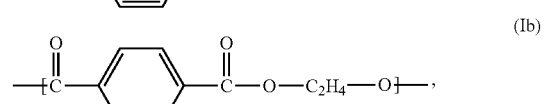

(Ib)

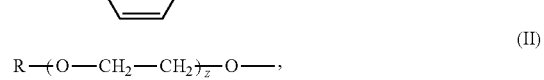

(II)

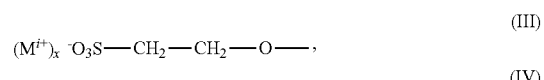

(III)

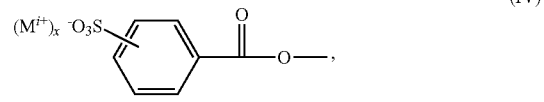

(IV)

wherein R is $C_1$-$C_4$ alkyl,
M is hydrogen or a monovalent or divalent cation
i is 1 or 2
x is 0.5 or 1 and the product i·x=1, and
z is a number from 3 to 35, and the compositions contain polyesters B having recurring structural units of the formula Ia defined above and having end groups of the formula V or polyesters B having recurring structural units of the formulae Ia and Ib defined above and having end groups of the formula V

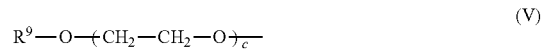

(V)

in which $R^9$ is hydrogen or $C_1$-$C_4$-alkyl, and c is a number from 1 to 50, preferably from 1 to 35.

In another particularly preferred embodiment, the compositions according to the invention contain polyesters A, which in addition to the recurring structural units of the formula Ia or of the formulae Ia and Ib defined above and of the end groups of the formulae II and III or of the formulae II and IV or of the formulae II, III and IV defined above contain the structural units of the formula Va and/or of the formula VIa or the structural units of the formulae Va and Vb and/or of the formulae VIa and VIb

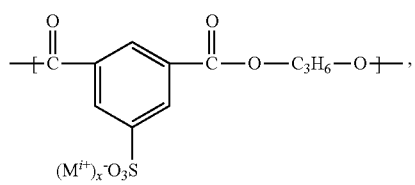

(Va)

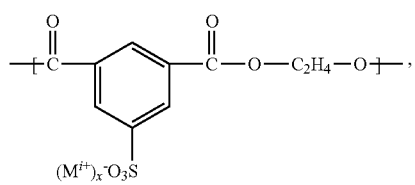

(Vb)

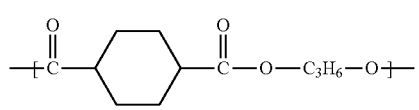

(VIa)

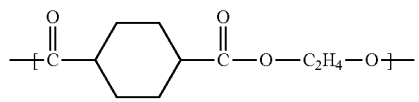

(VIb)

wherein M is hydrogen or a monovalent or divalent cation, i is 1 or 2 x is 0.5 or 1 and the product i·x=1.

The proportion of recurring structural units of the formula Ia or of recurring structural units of the formulae Ia and Ib or of recurring structural units of the formulae Ia, Va and/or Vb and/or VIa and/or VIb or of recurring structural units of the formulae Ia, Ib, Va and/or Vb and/or VIa and/or VIb in the polyesters A is usually 80 to 100 mol %, preferably 90 to 100 mol %, based on the total amount of recurring structural units in polyesters A.

The proportion of recurring structural units of the formula Ia or of the formulae Ia and Ib in the polyesters B is usually 80 to 100 mol %, preferably 90 to 100 mol %, based on the total amount of recurring structural units in polyester B.

The proportion of recurring structural units of the formulae Va and/or VIa or of the formulae Va and Vb and/or of the formulae VIa and VIb in the polyesters A is usually 0 to 15 mol %, preferably 1 to 15 mol %, particularly preferred 3 to 10 mol %, and very preferred 5 to 8 mol %, based on the total amount of recurring structural units in polyester A.

The proportion of recurring structural units of the formulae Va and/or VIa or of the formulae Va and Vb and/or of the formulae VIa and VIb in the polyesters B is usually 0 to 15 mol %, preferably 1 to 15 mol %, particularly preferred 3 to 10 mol %, and very preferred 5 to 8 mol %, based on the total amount of recurring structural units in polyester B.

The proportion of end groups of the formulae II and III or of the formulae II and IV or of the formulae II, III and IV in the polyesters A is usually 80 to 100 mol %, preferably 90 to 100 mol %, based on the total amount of end groups in polyester A.

The proportion of end groups of V in the polyesters B is typically 80 to 100 mol %, preferably 90 to 100 mol %, based on the total amount of end groups in polyester B.

In another particularly preferred embodiment, the compositions according to the invention comprise polyesters B of the following formula.

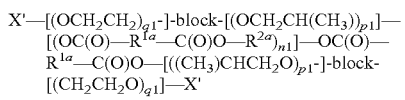

wherein the $R^{1a}$ radicals are 1,4-phenylene groups, the $R^{2a}$ radicals are ethylene or 1,2-propylene groups, the X' radicals are $C_{1-4}$ alkyl groups, preferably methyl or n-butyl, q1 is a number from 12 to 120 p1 is a number from 11 to 60, preferably from 15 to 50, and particularly preferred from 20 to 40, and n1 is a number from 2 to 10.

The block copolyesters B of the above formula are linear block copolyesters.

Particularly preferred are those block copolyesters B of the above formula in which n1 is a number from 3 to 9, in particular from 3 to 5, most preferred those derived from dimethyl terephthalate and 1,2-propylene glycol.

Also particularly preferred are those block copolyesters B of the above formula in which p1 is a number from 11 to 50 and q1 is a number from 18 to 60.

Very particularly preferred are block copolyesters B corresponding to the following formula

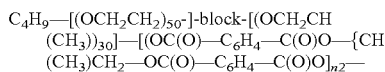

wherein n2 is a number from 2 to 15, preferably from 2 to 12, particularly preferred from 3 to 9 and most preferred from 4 to 9, and the $C_6H_4$ radicals are derived from terephthalic acid or its esters.

Such polyesters are known, for example, from EP 2670786 B1.

In a very particularly preferred embodiment, the compositions according to the invention contain polyesters A which are derived from terephthalic acid dimethyl ester, 5-sulfoisophthalic acid dimethyl ester sodium salt, ethylene glycol and/or 1,2-propylene glycol and whose end groups are derived from isethionic acid sodium salt and from polyethylene glycol monomethyl ether, in particular from polyethylene glycol monomethyl ether having a molecular weight of 700 to 2000 g/mol. and polyesters B which are derived from terephthalic acid dimethyl ester, ethylene glycol and/or 1,2-propylene glycol and the end groups of which are derived from polyethylene glycol monomethyl ether, in particular from polyethylene glycol monomethyl ether having the molecular weight of 700 to 2000 g/mol.

The polyesters A and B used in accordance with the invention generally have number-average molecular weights in the range from 700 to 50,000 g/mol, preferably from 800 to 25,000 g/mol, in particular 1,000 to 15,000 g/mol, especially preferred 1,200 to 12,000 g/mol.

The number average molecular weight is determined by size exclusion chromatography in aqueous solution using calibration with polyacrylic acid Na-salt standards. Such standards are commercially available, for example from PSS, Mainz. The molecular weight data in this description refer to the number average molecular weight.

The synthesis of the polyesters A and B used according to the invention can be carried out by polycondensation of components a) to g) by methods known per se.

Conveniently, the above components are first heated with the addition of a catalyst at normal pressure to temperatures of 160 to approx. 220° C. using an inert atmosphere, preferably in the presence of a salt of a $C_1$-$C_4$-alkyl carboxylic acid, in particular a dehydrated or partially hydrated sodium acetate $CH_3COONa \times (H_2O)_x$, where x is a number in the range from 0 to 2.9, and where this salt is used in amounts by weight of from 0.5% to 30%, preferably from 1% to 15%, particularly preferred from 3% to 8%, based on to the total amount of the monomers used and the salt of the carboxylic acid. Then the required molecular weights are built up in vacuo at temperatures of 160 to 240° C. by distilling off superstoichiometric amounts of the glycols used. The known transesterification and condensation catalysts of the prior art, such as titanium tetraisopropylate, dibutyltin oxide, alkali metal or alkaline earth metal alcoholates or antimony trioxide/calcium acetate, are suitable for the reaction.

A preferred process for the preparation of the polyesters A and B used according to the invention is characterized in that the condensation of the components is carried out in a one-pot process, the transesterification and condensation catalysts being added before heating.

The polyesters A and B used according to the invention are readily soluble in water, show no hydrolysis tendency at neutral or weakly acidic pH and form stable compositions which exhibit no or only insignificant degradation and thus loss of performance even under severe external conditions (storage at 45° C.).

In addition, the polyesters used according to the invention have excellent dispersing properties for fats and other fiber soils and thus counteract the graying of textiles. The performance of non-ionic polyesters with regard to increasing the primary washing capacity, the soil release activity and hydrophilization is not inferior to that of solid anionic types.

The polyester compositions according to the invention are prepared by dissolving the appropriate amount of polyester in a combination of water with water-miscible (cyclo)aliphatic alcohols.

(Cyclo)aliphatic alcohols containing 1 to 20 carbon atoms are used as component C). Alcohols with one or more hydroxyl groups can be used. The alcohols can be primary, secondary or tertiary alcohols.

Preferred are aliphatic alcohols with one to four hydroxy groups and one to ten, particularly preferred one to six carbon atoms. Also preferred are cycloaliphatic alcohols with one or two hydroxy groups and five to six carbon atoms.

Examples of aliphatic alcohols with one to four hydroxy groups and one to six carbon atoms include methanol, ethanol, propanol, butanol, pentanol, hexanol, ethane-1,2-diol, propane-1,2-diol, propane-1,3-diol, butane-1,2-diol, butane-1,3-diol, butane-1,4-diol, butane-2,3-diol, pentane-1,5-diol, hexane-1,6-diol, ethylene glycol monomethyl ether, diethylene glycol, diethylene glycol monomethyl ether, triethylene glycol, trimethylolpropane, glycerol, and pentaerythritol.

Examples of cycloaliphatic alcohols with one hydroxyl group and five to six carbon atoms are cyclopropanol and cyclohexanol.

Preferred components C) are methanol, ethanol, n-propanol, iso-propanol, glycerol, ethylene glycol, propanediol, diethylene glycol and triethylene glycol.

The polyesters are introduced directly or in portions into the water/alcohol mixture presented for dissolution at temperatures of 10 to 90° C., preferably 30 to 70° C., particularly preferred 50 to 60° C., and are completely dissolved by stirring.

To improve the solubility of the polyesters, low molecular weight dispersants (hydrotropes) can also be added before or during the dissolution process.

Alkyl benzene sulfonates are preferably used here, such as sodium cumene sulfonate, sodium xylene sulfonate or sodium toluene sulfonate. It proved useful to use these hydrotropes in an amount of 0.1 to 30% by weight, preferably 1 to 15% by weight, based on the total weight of the composition.

The polyester compositions according to the invention are stable for several months when stored at 5 to 45° C. The viscosities of the compositions according to the invention range from 15 to 15,000 mPas, preferably 100 to 8,000 mPas, particularly preferred in the range from 300 to 1,000 mPas.

Viscosities are measured using a Brookfield viscometer at 100 spindle revolutions per minute at 20° C. The spindle used is adjusted according to the viscosity range. The dispersions according to the invention are approximately colorless to slightly yellowish and largely transparent to opaque.

The polyester compositions according to the invention impart very good soil release properties to textile fibers, they substantially support the soil release capacity of the other detergent ingredients against oily, greasy or pigmentary soilings and prevent the deposition of particles from the wash liquor (in particular lime soaps and soil pigments) on the textile (graying).

A further object of the invention is the use of the polyester compositions according to the invention in detergents and cleaning agents, in after-treatment agents for laundry, in particular in a fabric softener, textile care agents and agents for finishing textiles.

Detergent and cleaning agent formulations containing the polyester compositions according to the invention can be in paste, gel or liquid form. Liquid detergents are particularly preferred.

Examples are heavy-duty detergents, mild detergents, color detergents, wool detergents, curtain detergents or modular detergents.

The polyester compositions according to the invention are also characterized in a surprising way by excellent drainage behavior, especially when rinsing plastic, ceramic and glass and metal surfaces. When cleaning hard surfaces, the tendency for lime deposits to form and the resoiling of the treated surface are reduced, the adhesion of oil and dirt is made more difficult and the surfaces can be cleaned again more easily. The use of the polyester compositions according to the invention proved to be particularly advantageous in drying dishes and cutlery.

The polyester compositions according to the invention can thus also be included in household cleaning agents, for example all-purpose cleaners, dishwashing agents, rinse aids, carpet cleaning and impregnating agents, cleaning and care agents for floors and other hard surfaces, e.g. made of plastic, ceramics, glass, stone, metal or surfaces coated with nanoparticles.

Examples of technical cleaning agents include plastic cleaning and care agents, such as for housings and car fittings, and cleaning and care agents for painted surfaces such as car bodies.

Depending on their intended use, the composition of the formulations must be adapted to the type of textiles to be treated or washed or to the surfaces to be cleaned.

The detergent and cleaning formulations may contain common ingredients such as surfactants, emulsifiers, builders, bleach catalysts and activators, sequestering agents, graying inhibitors, color transfer inhibitors, color fixing agents, enzymes, optical brighteners, softening components. In addition, formulations or parts of the formulation may be selectively colored and/or perfumed by dyes and/or fragrances.

EXAMPLES

The following examples illustrate the invention without limiting it.
Polyester a (Anionic Component)

The preparation and composition of the anionic polyester component A can be taken from Example 1 of patent EP 3 222 647 B1. This is, for example, a polyester prepared by polycondensation of terephthalic acid dimethyl ester, 5-sulfoisophthalic acid dimethyl ester sodium salt, ethylene glycol and 1,2-propylene glycol, and which had end groups derived from isethionic acid sodium salt and from polyethylene glycol monomethyl ether
Polyester B (Non-Ionic Component)

The composition of the nonionic polyester components B is indicated in the following table. Their preparation is analogous to that of the anionic polyester component, with the difference that no monomers with ionic groups are used for synthesis. The melt condensation process is known to the expert.

The following polyesters B were used for the examples, the data being in mol:

|  | terephthalic acid | 1,2-propane diol | 1,2-ethane diol | MPEG*) 750 | MPEG*) 2000 |
|---|---|---|---|---|---|
| Nio 1 | 3 | 2 | — | 2 | — |
| Nio 2 | 5 | 4 | — | — | 2 |
| Nio 3 | 6 | 4 | 1 | 2 | — |
| Nio 4 | 3 | 2 | — | 1 | 1 |

*)MPEG = polyethylene glycol monomethyl ether with an average molecular weight of 750 or 2000

Example 1

In a heatable 1 liter Buchi autoclave equipped with an impeller stirrer, internal thermometer and reflux condenser, 300 g of 1,2-propanediol and 60 g of 1,2,3-propanetriol are introduced. To the mixture of polyols, 16 g of distilled water is added, inerted with nitrogen, and then heated to 50° C. with stirring. After reaching the target temperature, 80 g of a 70% solution of non-ionic polyester B (Nio 1) is added with stirring. A clear solution of the components is formed. The solution is tempered to 55° C. 44 g of the anionic polyester component polyester A (for definition see above) is added in small portions as powder (particle size<1000 μm) to the solution in nitrogen countercurrent within 30 minutes. A slight opalescence initially forms within the solution, which changes to a milky white composition within 30 minutes. Once the addition is complete, stirring is continued for an additional 60 minutes at 55° C. and then the composition is drained into a suitable vessel via the bottom valve of the stirred autoclave.

The viscosity of the composition at 20° C. measured with a Brookfield viscometer (spindle3, 100 rpm) is 400 mPa*s. After three months of storage, the viscosity of the suspension was determined to be 600 mPa*s (measured on a sample tempered to 20° C.).

Example 2

In a heatable 1 liter Buchi autoclave equipped with an Intermig stirrer, internal thermometer and reflux condenser, 310 g of 1,2-propanediol and 85 g of 1,2,3-propanetriol are introduced. To the mixture of polyols, 18 g of distilled water is added, inerted with nitrogen, and then heated to 50° C. with stirring. After reaching the target temperature, 70 g of a 75% solution of nonionic polyester B (Nio2) is added with stirring. A clear solution of the components is formed. The solution is tempered to 52° C.

52.5 g of the anionic polyester component polyester A (see above for definition) is added in small portions as a powder (particle size<1200 μm) to the solution in nitrogen countercurrent within 30 minutes. A slight opalescence initially forms within the solution, which changes to a milky white composition within 30 minutes. After completion of the addition, stirring is continued for a further 60 minutes at 55° C. and then the composition is drained into a suitable vessel via the bottom valve of the stirred autoclave.

The viscosity of the composition at 20° C. measured with a Brookfield viscometer (spindle3, 100 rpm) is 700 mPa*s. After 2 months of warm storage at 45° C., a viscosity of 1000 mPa*s was determined (measured at 20° C.).

Example 3

In a heatable 1 liter Buchi autoclave equipped with an Intermig stirrer, internal thermometer and reflux condenser, 350 g of 1,2-propanediol and 75 g of 1,2,3-propanetriol are introduced. To the mixture of polyols, 15 g of distilled water is added, inerted with nitrogen, and then heated to 50° C. with stirring. After reaching the target temperature, 40 g of a 70% solution of nonionic polyester B (Nio1) is added with stirring. A clear solution of the components is formed.

In addition, 40 g of a second nonionic polyester 2 (Nio3) is added as a 75% solution in water to the glycol/water mixture. The solution is tempered to 52° C.

47.5 g of the anionic polyester component Polyester A (see above for definition) is added in small portions as a powder (particle size<1200 μm) to the solution in nitrogen countercurrent within 30 minutes. A slight opalescence initially forms within the solution, which changes to a milky white composition within 30 minutes. Once the addition is complete, stirring is continued for an additional 60 minutes at 55° C. and then the composition is drained into a suitable vessel via the bottom valve of the stirred autoclave.

The viscosity of the composition at 20° C. measured with a Brookfield viscometer (spindle3, 100 rpm) is 600 mPa*s. After three months of storage at 45° C., the viscosity increased to 900 mPa*s. The measurement was made after the sample had been tempered to 20° C.

Example 4

In a heatable 1 liter Buchi autoclave equipped with an Impeller stirrer, internal thermometer and reflux condenser, 200 g of 1,2-propanediol, 100 g of 1,2-ethanediol and 70 g of 1,2,3-propanetriol are introduced. To the mixture of polyols, 16 g of distilled water is added, inerted with nitrogen, and then heated to 50° C. with stirring. After reaching the target temperature, 40 g of a 70% solution of nonionic polyester B (Nio1) is added with stirring. A clear solution of the components is formed. In addition, a second nonionic polyester B (Nio4) is added to the solution. The solution is tempered to 50° C.

35 g of the anionic polyester component polyester A (see above for definition) is added in small portions as a powder (particle size<1200 μm) to the solution in nitrogen countercurrent within 30 minutes. A slight opalescence initially forms within the solution, which changes to a milky white composition within 30 minutes. After completion of the addition, stirring is continued for a further 60 minutes at 55° C. and then the composition is drained into a suitable vessel via the bottom valve of the stirred autoclave.

The viscosity of the composition at 20° C. measured with a Brookfield viscometer (spindle3, 100 rpm) is 500 mPa*s immediately after preparation. After two months of storage at 45° C. in a closed vessel, the viscosity increased to 700 mPa*s. The measurement was made after the sample had been tempered to 20° C.

The invention claimed is:

1. Compositions containing
   A) at least one anionic polyester obtainable by polymerization of the components
      a) one or more aromatic dicarboxylic acids which are free from sulfo groups and/or salts thereof and/or anhydrides thereof and/or esters thereof,
      b) optionally one or more dicarboxylic acids containing sulfo groups, their salts and/or their anhydrides and/or their esters,
      c) one or more aliphatic diols of the formula (1)

      H—(OC$_m$H$_{2m}$)$_s$—OH (1), wherein
      m is a number from 2 to 10,
      s is a number from 1 to 200,
      d) optionally one or more compounds of the formula (2)

      R$^1$O(C$_o$H$_{2o}$O)$_p$H (2)

wherein
      R$^1$ is a linear or branched alkyl group containing 1 to 22 carbon atoms,
      o is a number from 2 to 10,
      p is a number from 1 to 200,
      e) optionally one or more compounds of the formula (3) and/or of the formula (4)

      R$^2$(C$_q$H$_{2q}$O)$_r$H (3),

      (Me$^{a+}$)$_b^-$O$_3$S—C$_6$H$_4$—COOR$^{10}$ (4), wherein
      q is a number from 2 to 10,
      r is a number from 1 to 10, and
      R$^2$ is a radical (Me$^{a+}$)$_b^-$OOC— or (Me$^{a+}$)$_b^-$O$_3$S—,
      R$^{10}$ is hydrogen or C$_1$-C$_6$-alkyl,
      Me is hydrogen or an a-valent cation,
      a is a number from 1 to 3,
      b is a number having the value 1/a, and
      f) optionally one or more crosslinking polyfunctional compounds, with the proviso that at least one of components b) or e) is present,
   B) at least one nonionic polyester obtainable by polymerization of components a), c), d) and optionally f) defined above,
   C) one or more aliphatic or cycloaliphatic alcohols containing 1-20 carbon atoms, and
   D) water.

2. The compositions according to claim 1, wherein the proportion by weight of the polyesters A) and B) in the composition is 1 to 50%.

3. The compositions according to claim 1, wherein the proportion by weight of polyester A) in the total mass of polyesters A) and B) is 20 to 80%.

4. The compositions according to claim 1, characterized in that the proportion by weight of polyester B) in the total mass of polyesters A) and B) is 80 to 20%.

5. The compositions according to claim 1, wherein component a) is selected from the group consisting of terephthalic acid, isophthalic acid, naphthalenedicarboxylic acid, alkali metal salts or alkaline earth metal salts thereof or dialkyl esters thereof.

6. The compositions according to claim 1 wherein component b) is selected from the group consisting of sulfoterephthalic acid, sulfoisophthalic acid, sulfonaphthalene dicarboxylic acid, their alkali metal salts or alkaline earth metal salts or their dialkyl esters.

7. The compositions according to claim 1 wherein component c) is selected from the group consisting of ethylene glycol, propylene glycol or mixtures thereof.

8. The compositions according to claim 1 characterized in that component d) is a compound of formula (2a)

   R$^3$O(CHR$^4$CHR$^5$O)$_s$H (2a)

wherein
   R$^3$ represents a linear or branched alkyl group with 1 to 6 C atoms,
   R$^4$ and R$^5$ independently of one another represent hydrogen or an alkyl group having 1 to 4 carbon atoms, and
   s is a number from 1 to 50.

9. The compositions according to claim 1 wherein component e) is a compound of the formula (3a)

   MeO$_3$S—(CHR$^6$CHR$^7$O)$_t$H (3a)

wherein
   Me is hydrogen, a monovalent metal cation or an ammonium cation,
   R$^6$ and R$^7$ independently of one another represent hydrogen or an alkyl group having 1 to 4 carbon atoms, and
   t is a number from 1 to 50.

10. The compositions according to claim 1, wherein component e) is a compound of the formula (3b)

    MeO$_3$S—C$_6$H$_4$—COOR$^{11}$ (3b)

wherein
    Me is hydrogen, a monovalent metal cation or an ammonium cation, and
    R$^{11}$ is hydrogen, a monovalent metal cation or an ammonium cation, and
    wherein the sulfonyl group is located in the 3-position of the phenyl ring.

11. The compositions according to claim 9 wherein component e) is a mixture of the compounds of the formulae (3a) and (3b).

12. The compositions according to claim 1 wherein polyester A) contains recurring structural units of the formula Ia and end groups of the formula II and of the formula III or end groups of the formula II and of the formula IV or end groups of the formula II, III and IV or contains recurring structural units of the formula Ia and of the formula Ib and end groups of the formula II and of the formula III or end groups of the formula II and of the formula IV or end groups of the formula II, III and IV,

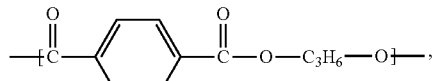
(Ia)

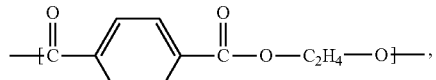
(Ib)

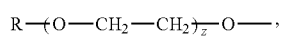
(II)

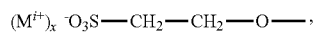
(III)

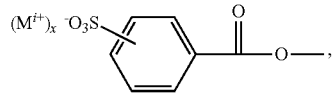
(IV)

wherein R is $C_1$-$C_4$-alkyl,
M is hydrogen or a monovalent or divalent cation
i is 1 or 2
x is 0.5 or 1 and the product $i \cdot x = 1$, and
z is a number from 3 to 35, and wherein polyester B) contains recurring structural units of the formula Ia defined above and end groups of the formula V or contains recurring structural units of the formula Ia and of the formula Ib defined above and end groups of the formula V

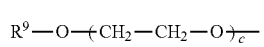
(V)

wherein $R^9$ is hydrogen or $C_1$-$C_4$ alkyl, and
c is a number from 1 to 35.

13. The compositions according to claim 12, wherein polyester A) contains, in addition to the recurring structural units of the formula Ia or of the formulae Ia and Ib and the end groups of the formulae II and III or of the formulae II and IV or of the formulae II, III and IV, the structural units of the formula Va and/or of the formula VIa or the structural units of the formulae Va and Vb and/or of the formulae VIa and VIb

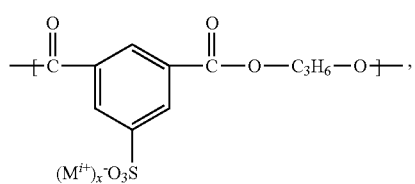
(Va)

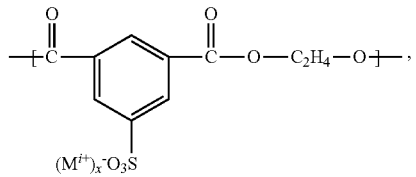
(Vb)

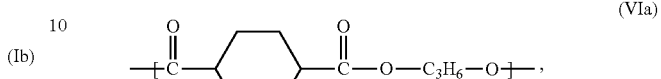
(VIa)

(VIb)

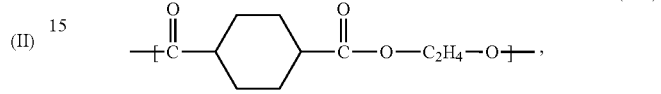

wherein M is hydrogen or a monovalent or divalent cation,
i is 1 or 2
x is 0.5 or 1, and the product $i \cdot x = 1$.

14. The compositions according to claim 12, wherein the proportion of recurring structural units of the formula Ia or of recurring structural units of the formulae Ia and Ib or of recurring structural units of the formulae Ia, Va and/or Vb and/or Via and/or VIb or of recurring structural units of the formulae Ia, Ib, Va and/or Vb and/or Via and/or VIb in polyester A) is from 80 to 100 mol %, based on the total amount of recurring structural units in polyester A), and wherein the proportion of recurring structural units of the formula Ia or of recurring structural units of the formulae Ia and Ib in polyester B) is from 80 to 100 mol %, based on the total amount of recurring structural units in polyester B).

15. The compositions according to claim 12, wherein the proportion of end groups of the formulae II and III or of the formulae II and IV or of the formulae II, III and IV in polyester A) is 80 to 100 mol %, based on the total amount of end groups in polyester A), and wherein the proportion of end groups of formula V in polyester B) is 80 to 100 mol %, based on the total amount of end groups in polyester B).

16. The compositions according to claim 1 wherein polyesters A) are derived from terephthalic acid dimethyl ester, 5-sulfoisophthalic acid dimethyl ester sodium salt, ethylene glycol and/or 1, 2-propylene glycol and wherein their end groups are derived from isethionic acid sodium salt and from polyethylene glycol monomethyl ether, and wherein polyesters B are derived from terephthalic acid dimethyl ester, ethylene glycol and/or 1,2-propylene glycol and wherein their end groups are derived from polyethylene glycol monomethyl ether.

17. The compositions according to claim 1 wherein component C) is selected from the group consisting of methanol, ethanol, n-propanol, isopropanol, glycerol, ethylene glycol, propanediol, diethylene glycol, triethylene glycol and mixtures of two or more thereof.

18. Detergents and cleaning agents comprising a composition according to claim 1.

\* \* \* \* \*